US011049211B2

(12) United States Patent
Fabius (10) Patent No.: US 11,049,211 B2
(45) Date of Patent: Jun. 29, 2021

(54) METHODS AND SYSTEM FOR ASYNCHRONOUSLY BUFFERING RENDERING BY A GRAPHICS PROCESSING UNIT

(71) Applicant: CHANNEL ONE HOLDINGS INC., Tampa, FL (US)

(72) Inventor: Aidan Fabius, Waterloo (CA)

(73) Assignee: CHANNEL ONE HOLDINGS INC., Tampa, FL (US)

( * ) Notice: Subject to any disclaimer, the term of this patent is extended or adjusted under 35 U.S.C. 154(b) by 0 days.

(21) Appl. No.: 16/027,525

(22) Filed: Jul. 5, 2018

(65) Prior Publication Data
US 2019/0043156 A1 Feb. 7, 2019

Related U.S. Application Data

(60) Provisional application No. 62/529,099, filed on Jul. 6, 2017.

(51) Int. Cl.
*G06T 1/20* (2006.01)
*G06T 1/60* (2006.01)
(Continued)

(52) U.S. Cl.
CPC .................. *G06T 1/20* (2013.01); *G06T 1/60* (2013.01); *G09G 5/00* (2013.01); *G09G 5/001* (2013.01);
(Continued)

(58) Field of Classification Search
CPC . G06T 1/20; G06T 1/60; G09G 5/393; G09G 5/363; G09G 5/001; G09G 5/399; G09G 5/00; G09G 2360/12; G09G 2360/06
See application file for complete search history.

(56) References Cited

U.S. PATENT DOCUMENTS

2006/0132491 A1* 6/2006 Riach .................... G06T 15/005
345/505
2010/0020088 A1 1/2010 Harumoto
(Continued)

FOREIGN PATENT DOCUMENTS

EP 2128824 A1 12/2009
EP 3336833 A4 4/2019
(Continued)

OTHER PUBLICATIONS

Extended European Search Report, dated Jul. 11, 2019.
(Continued)

*Primary Examiner* — Maurice L. McDowell, Jr.
*Assistant Examiner* — Donna J. Ricks
(74) *Attorney, Agent, or Firm* — Valauskas Corder LLC (57) ABSTRACT

Systems and method for triple buffering of a graphics display without use of interrupts using at least two command buffers that are capable of operating asynchronously. A first command buffer generally contains commands, which, when executed, write frame data to a plurality of frame buffers in round-robin fashion. A second command buffer, which is executed asynchronously to the first command buffer, contains commands to handle waiting for frames to be completed, handle display timing (e.g., display synchronization interval, such vertical sync or vertical blanking intervals), and to cause the display controller to display the correct frames.

18 Claims, 4 Drawing Sheets

(51) Int. Cl.
*G09G 5/00* (2006.01)
*G09G 5/393* (2006.01)
*G09G 5/399* (2006.01)
*G09G 5/36* (2006.01)

(52) U.S. Cl.
CPC ............. *G09G 5/363* (2013.01); *G09G 5/393* (2013.01); *G09G 5/399* (2013.01); *G09G 2360/06* (2013.01); *G09G 2360/12* (2013.01)

(56) References Cited

U.S. PATENT DOCUMENTS

| | | |
|---|---|---|
| 2010/0026689 A1 | 2/2010 | Parikh et al. |
| 2011/0023040 A1 | 1/2011 | Hendry et al. |
| 2012/0133732 A1 | 5/2012 | Guoping et al. |
| 2014/0092150 A1* | 4/2014 | Slavenburg ............ G09G 5/001 345/698 |
| 2017/0154403 A1 | 1/2017 | Toth et al. |
| 2017/0228855 A1 | 8/2017 | Bates |
| 2018/0197509 A1 | 7/2018 | Kobayashi et al. |
| 2018/0277054 A1 | 9/2018 | Colenbrander |
| 2019/0043156 A1 | 2/2019 | Fabius |

FOREIGN PATENT DOCUMENTS

| | | | |
|---|---|---|---|
| WO | 199940518 A1 | 8/1999 | |
| WO | WO 99/40518 * | 8/1999 | ............. G06T 13/00 |
| WO | 2006126042 A1 | 11/2006 | |
| WO | 2017026230 A1 | 2/2017 | |

OTHER PUBLICATIONS

Extended European Search Report for EPO Pat. App. No. 19177537.8-1210, dated Jul. 16, 2019.
International Search Report and Written Opinion, Canadian Intellectual Property Office, dated Sep. 6, 2019.

* cited by examiner

METHODS AND SYSTEM FOR ASYNCHRONOUSLY BUFFERING RENDERING BY A GRAPHICS PROCESSING UNIT

FIELD

The embodiments disclosed herein relate to rendering computer graphics and, in particular, to methods and systems for buffering images for display in safety-critical environments, such as in aviation.

INTRODUCTION

The following paragraphs are not an admission that anything discussed in them is prior art or part of the knowledge of persons skilled in the art.

Graphical applications running in a safety-critical environment may require assurances that display data is free from defects and artifacts, and represent the data that is actually intended for display by graphical applications.

Conventionally, double or triple buffering techniques are used in computer graphics systems to ensure that data is correctly displayed. Multiple buffering, as these techniques are called, allow for display data to be shown without "tearing" and with minimal latency. In particular, multiple buffering allows for asynchronous reading and writing of the buffers by one or more graphical applications, which write data, and one or more graphic processing units (GPUs), which read data. In the absence of multiple buffering, and especially triple buffering, the graphical applications must either wait for frame data to be read before writing, or else the GPU may display only partially complete frame data. The former can result in "stutter" and reduced performance, while the latter can result in "tearing", among other artifacts.

In some cases, it may be possible to force synchronization of writes with vertical sync (VSYNC), vertical blanking (VBLANK) or other display synchronization intervals. However, this can result in reduced performance in the best case, and may cause difficulties in system implementation, such as where multiple central processing units (CPUs) or GPUs are used. For this reason, asynchronous writing and reading of buffers is traditionally preferred.

Traditional implementations of triple buffering rely on the use of hardware or software interrupts (i.e., signals that cause the execution of lower-priority code to be interrupted in favor of the execution of higher-priority code) to select which of the three buffers is to be shown during a next display synchronization interval of the display hardware. This is because graphics rendering is time-sensitive and a heavily loaded processor may be otherwise unable to process the reading and writing of frame data quickly enough to ensure that the GPU reads complete frame data. In doing so, the system allows for maximum performance in the generation of frame data, minimal latency in displaying the frame data, and therefore a smooth flow of frame data to the display, free artifacts.

Although multiple buffered frame data is generally desirable, in some systems, such as safety critical real-time systems, the use of interrupts may not be desirable, or possible, which makes it difficult to take advantage of the traditional triple buffering approach. Even where interrupts are possible, their use may cause significant difficulties when certifying the system to ensure that it is reliable and free of potentially critical errors or race conditions.

SUMMARY

In a broad aspect, there is provided a method of asynchronously buffering rendering by a GPU to a display in a safety critical environment, the method comprising: providing a plurality of frame buffers; a first command processor executing a first command buffer in the GPU to write frame data to the plurality of frame buffers in round-robin fashion; a second command processor executing a second command buffer in the GPU asynchronously and in parallel to execution of the first command buffer, wherein executing the second command buffer comprises: waiting for a signal from the first command processor to transmit frame data to the display controller; signaling the display controller to display contents of a selected frame buffer on a next display synchronization interval.

In some cases, executing the second command buffer comprises waiting for a display synchronization interval start signal from a display controller, prior to signaling the display controller to display the contents of the selected frame buffer.

In some cases, executing the first command buffer comprises: selecting a selected frame buffer from the plurality of frame buffers to receive frame data; writing the frame data to the selected frame buffer; and upon completing the writing of the frame data to the selected frame buffer, marking the selected frame buffer as most recently completed, and signaling the second command processor to transmit frame data to a display controller.

In some cases, selecting the selected frame buffer further comprises determining a displayed frame buffer with contents currently displayed by the display controller, and wherein the selection is performed in round-robin fashion from the plurality of frame buffers other than the displayed frame buffer.

In some cases, the signal comprises a frame completed flag stored in a memory, and wherein signaling the second command processor to push the frame data to the display controller comprises setting the frame completed flag to a first value.

In some cases, executing the second command buffer further comprises setting the frame completed flag to a second value.

In some cases, the first value may be true, and the second value may be false.

In some cases, executing the second command buffer further comprises, prior to waiting for the display synchronization interval start signal, detecting that a display synchronization interval is in progress, and waiting for a display synchronization interval completion signal from the display controller.

In some cases, executing the second command buffer further comprises waiting one or more predetermined intervals to prevent multiple frame updates in a selected display synchronization interval.

In some cases, the plurality of frame buffers consists of a first frame buffer and a second frame buffer.

In some cases, the plurality of frame buffers consists comprises at least three frame buffers.

In another broad aspect, there is provided a non-transitory computer readable medium storing computer-executable instructions, which when executed by a graphics unit comprising first and second command processors, cause the graphics unit to carry out the methods described herein.

In another broad aspect, there is provided an asynchronously buffered graphic display rendering system, the system comprising: a memory storing a plurality of frame buffers; a graphics unit comprising a first command processor and a second command processor that operates asynchronously to the first command processor, the first command processor configured to: execute a first command buffer to write frame data to the plurality of frame buffers in round-robin fashion; and the second command processor configured to: execute a second command buffer asynchronously to execution of the first command buffer, wherein executing the second command buffer comprises: waiting for a signal from the first command buffer to transmit frame data to the display controller; signaling the display controller to display contents of a selected frame buffer on a next display synchronization interval.

In some cases, executing the second command buffer comprises waiting for a display synchronization interval start signal from a display controller, prior to signaling the display controller to display the contents of the selected frame buffer.

In some cases, executing the first command buffer comprises: selecting a selected frame buffer from the plurality of frame buffers to receive frame data; writing the frame data to the selected frame buffer; and upon completing the writing of the frame data to the selected frame buffer, marking the selected frame buffer as most recently completed, and signaling the second command processor to transmit frame data to a display controller.

In some cases, selecting the selected frame buffer further comprises determining a displayed frame buffer with contents currently displayed by the display controller, and wherein the selection is performed in round-robin fashion from the plurality of frame buffers other than the displayed frame buffer.

In some cases, the signal comprises a frame completed flag stored in a memory, and wherein signaling the second command processor to push the frame data to the display controller comprises setting the frame completed flag to a first value.

In some cases, executing the second command buffer further comprises setting the frame completed flag to a second value.

In some cases, the first value may be true, and wherein the second value may be false.

In some cases, executing the second command buffer further comprises, prior to waiting for the display synchronization interval start signal, detecting that a synchronization is in progress, and waiting for a display synchronization interval completion signal from the display controller.

In some cases, executing the second command buffer further comprises waiting one or more predetermined intervals to prevent multiple frame updates in a selected display synchronization interval.

In some cases, the plurality of frame buffers consists of a first frame buffer and a second frame buffer.

In some cases, the plurality of frame buffers consists comprises at least three frame buffers.

DRAWINGS

For a better understanding of the various embodiments described herein, and to show more clearly how these various embodiments may be carried into effect, reference will be made, by way of example only, to the accompanying drawings which show at least one exemplary embodiment, and in which are now described.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF VARIOUS EMBODIMENTS

Various apparatus or processes will be described below to provide an example of one or more embodiments. No embodiment described below limits any claimed embodiment and any claimed embodiment may cover processes or apparatus that differ from those described below. The claimed embodiments are not limited to apparatus or processes having all of the features of any one apparatus or process described below or to features common to multiple or all of the apparatus described below. It is possible that an apparatus or process described below is not an embodiment of any claimed embodiment. Any embodiment disclosed below that is not claimed in this document may be the subject matter of another protective instrument, for example, a continuing patent application, and the applicants, inventors or owners do not intend to abandon, disclaim or dedicate to the public any such embodiment by its disclosure in this document.

The terms "an embodiment," "embodiment," "embodiments," "the embodiment," "the embodiments," "one or more embodiments," "some embodiments," and "one embodiment" mean "one or more (but not all) embodiments of the subject matter described in accordance with the teachings herein," unless expressly specified otherwise.

The terms "including," "comprising" and variations thereof mean "including but not limited to", unless expressly specified otherwise. A listing of items does not imply that any or all of the items are mutually exclusive, unless expressly specified otherwise. In addition, the terms "a," "an" and "the" mean "one or more," unless expressly specified otherwise.

It should also be noted that the terms "coupled" or "coupling" as used herein can have several different meanings depending in the context in which these terms are used. For example, the terms coupled or coupling can have a mechanical or electrical connotation. For example, as used herein, the terms coupled or coupling can indicate that two elements or devices can be directly connected to one another or connected to one another through one or more intermediate elements or devices via an electrical element or electrical signal (either wired or wireless) or a mechanical element depending on the particular context.

Further, although processes, methods, and the like may be described (in the disclosure and/or in the claims) having acts in a certain order, such processes and methods may be configured to work in alternate orders while still having utility. In other words, any sequence or order of actions that may be described does not necessarily indicate a requirement that the acts be performed in that order. The acts of processes and methods described herein may be performed in any order that is practical and has utility. Further, some actions may be performed simultaneously, if possible, while others may be optional, if possible.

When a single device or article is described herein, it may be possible that more than one device/article (whether or not they cooperate) may be used in place of a single device/article. Similarly, where more than one device or article is described herein (whether or not they cooperate), it may be possible that a single device/article may be used in place of the more than one device or article.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. This may also include any graphics rendering device that renders 2D or 3D graphics.

Generally, graphical applications running in a safety-critical environment may require assurances that an image created by the GPU corresponds to the image that the graphical applications actually intended.

Many GPUs contain one or more independent GPU engines—specialized graphics processors that are adapted to perform certain graphical operations quickly and efficiently—and display controllers. A GPU engine—sometimes also called a 3D engine—generates graphical images, which are stored in temporary buffers, while the display controller shows the images on an attached monitor. A GPU engine may generate new images at any rate, e.g., from less than one frame per second, and up to thousands of frames per second. Moreover, the rate of frame generation may be context sensitive, and thus may change over time. In contrast, a display controller typically updates at a fixed rate, usually around 60 times per second.

The conventional approach for moving images from a GPU engine to the display is to use double buffering. As the name implies, in double buffered mode there are two available framebuffers for a GPU engine to draw into. Generally, a GPU engine will draw into the available buffers in a "ping-pong" order (i.e., 0, 1, 0, 1, etc.), and present the buffers to the display in the same order. Drawing into a buffer that is in the process of being displayed by the display controller would cause undesired visual artifacts, such as tearing. Therefore, generally the buffer that contains the currently displayed image data is locked, so that only the other buffer is used for writing new frame data. However, with only two buffers, one is always currently displayed, leaving only one available buffer to draw into. This forces the CPU and GPU engine into a fairly synchronous relationship and will often result in the CPU or GPU engine blocking while waiting for the display controller to finish with the a buffer.

Another conventional approach is triple buffering, in which where there are three available frame buffers. As with double buffering, the GPU engine will draw into the buffers in round-robin order (0, 1, 2, 0, 1, 2, etc.) and present the buffers to the display controller in the same order. This allows the CPU and GPU engine to exhibit some degree of asynchronous behavior, where the CPU does not need to block or wait on the GPU engine, but it introduces up to two frames of latency before the most recently completed frame is shown. An improved form of triple buffering, sometimes called enhanced triple buffering, reduces this latency by always displaying the most recently completed frame, instead of displaying buffers in the order they are completed. This requires the GPU engine to keep track of which buffer is currently used by the display controller, and to alternate between the remaining two buffers. In each display controller processing period, or cycle, it chooses the most recently drawn buffer to be shown. Enhanced triple buffering ensures the display is always showing the most recently drawn frame, and that the GPU engine never needs to block on the display controller, but introduces complex control logic to enable its operation.

One example of an enhanced triple buffering sequence is demonstrated in Table 1. The example of Table 1 assumes an initial condition in which the GPU engine is drawing into frame buffer 0 and the display controller is displaying the contents of frame buffer 2. Likewise, the application is drawing frames at a rate of 100 Hz (i.e., period of 10 ms), while the display controller is displaying frames at a rate of 50 Hz (i.e., period of 20 ms).

TABLE 1

| Time (ms) | GPU engine | Display | Notes |
|---|---|---|---|
| 0 | 0 | 2 | Initial condition |
| 10 | 1 | 2 | Display controller still shows buffer #2, so GPU engine chooses next available buffer (i.e., buffer #0) for rendering |
| 20 | 0 | 1 | Display controller updates, chooses buffer #1 as most recently completed |
| 30 | 2 | 1 | Display controller still shows buffer #1, so GPU engine chooses next available buffer (i.e., buffer #2) for rendering |
| 40 | 0 | 2 | Display controller updates, chooses buffer #2 as most recently completed |
| 50 | 1 | 2 | Display controller still shows buffer #2, so GPU engine chooses next available buffer (i.e., buffer #1) |

As noted above, the enhanced triple buffering approach relies upon the ability for the GPU engine and display controller to exchange information, either with each other or with some external control mechanism (e.g., CPU).

The conventional approach for implementing enhanced triple buffering is to control the GPU engine and display controller using a CPU and hardware or software interrupts. In this approach, the GPU engine writes a "most recently completed frame number" value to CPU-accessible memory upon completing rendering of a frame. In parallel, the display controller triggers a interrupt in every display period. Therefore, in each display period, the CPU interrupt handler is invoked, at which point the CPU can read the most recently completed frame, and update the display controller to point to that buffer. The CPU can also update the "available to draw" buffer list so that the GPU engine does not draw to the newly displayed buffer.

In such an approach, care is generally taken to handle close timing scenarios. For example, the display controller typically has about 1 ms of "VBLANK" time during which the display can be updated without artifacts, so the interrupt handler must complete its work within that time. Also, the GPU engine may take some amount of time after the drawn frame is complete to write the frame number into CPU-accessible memory. Further timing issues can arise from the asynchronous operation of the GPU engine and CPU, and from the CPU drawing and swapping buffers at an extremely high rate.

Although enhanced triple buffering is generally desirable, particularly where low latency is important, many embedded and safety critical systems do not support interrupts, or do not support interrupts for external devices such as GPUs, and therefore cannot implement interrupt-based enhanced triple buffering.

However, the described embodiments generally provide for the use of triple- or multiple-buffering techniques, without the use of hardware or software-based interrupts, as described further herein.

Figure 1:
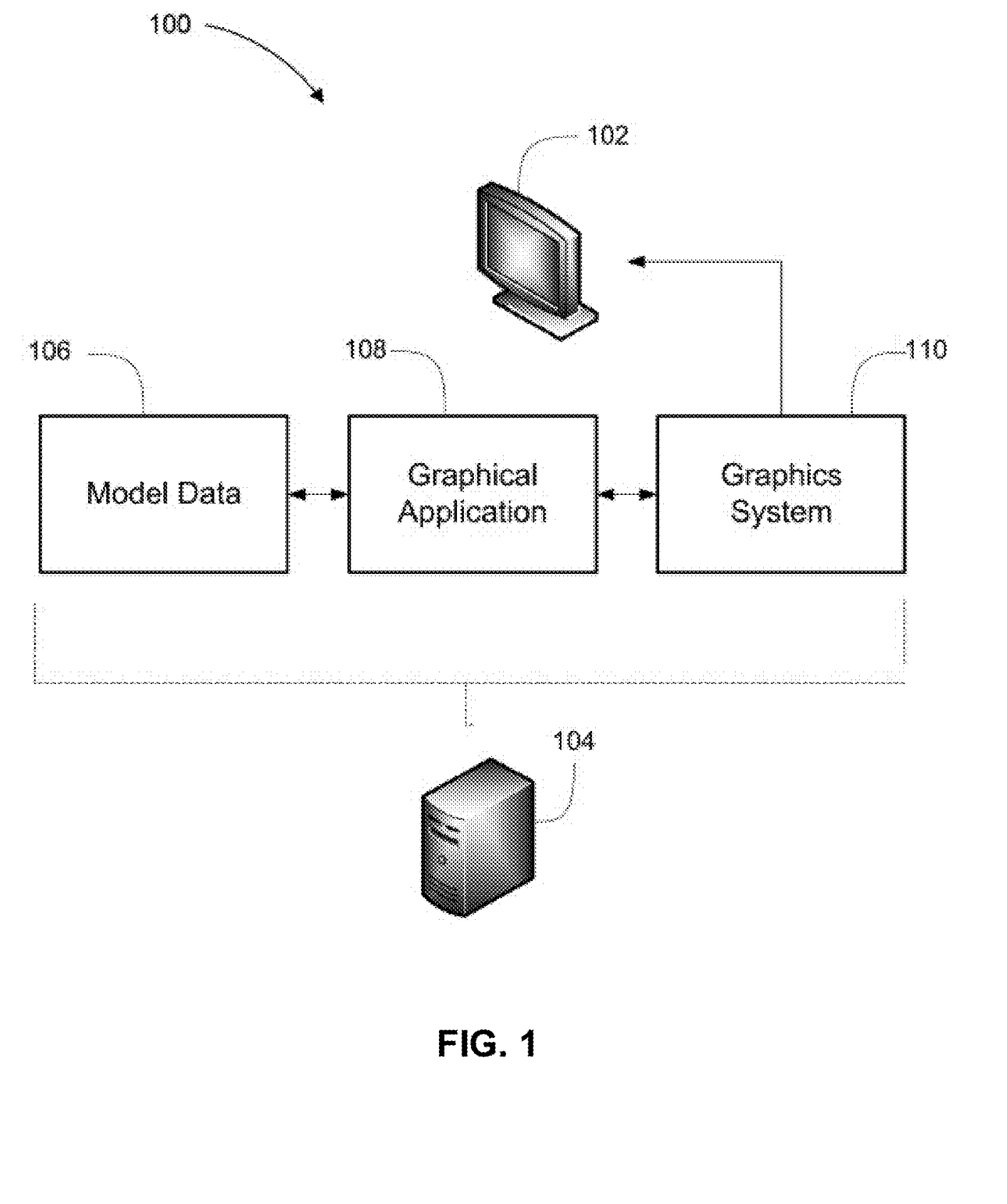
FIG. 1 is a schematic diagram of a host computer system according to at least one embodiment.

Referring now to FIG. 1, illustrated therein is a host computer system 100 according to at least one embodiment. The host computer system 100 comprises a computer display or monitor 102, and a computer 104. Other components of the system are not shown, such as user input devices (e.g., a mouse, a keyboard, etc.). Generally the host computer system 100 may be used for displaying graphics objects or images on the display or monitor 102.

According to at least one embodiment, the host computer system 100 may be a computer system used in a motorized vehicle such as an aircraft, marine vessel, or rail transport vehicle, or in a medical imaging system, a transportation system, or any other system that uses a computer and monitor. In some cases, the computer system may be in use in a safety critical environment.

The computer 104 may generally include system memory, storage media, and a processor (CPU). In some cases, the computer 104 may also include dedicated graphics hardware, which may include a graphics system 110 and video memory. In other cases, the computer 104 may perform at least some graphics-related operations using the processor and system memory.

According to at least one embodiment, the host computer system 100 may be a safety-critical, mission-critical, or high-reliability system. In such a case, the host computer system 100 may be required to comply with specific operating standards, such as standards related to reliability and fault tolerance.

In order to display a rendering of the model data 106 on the monitor 102, such as may be determined by a graphical application 108 of the host computer system 100, the model data 106 must first be processed by a graphics system 110. The graphics system 110 may receive the model data 106 and may also receive instructions from the graphical application 108 as to how the model data 106 should be processed.

The graphics system 110 may include any or all of a GPU and video memory, and it may use any or all of the CPU and system memory as well.

The term "GPU", as used herein, broadly refers to any graphics rendering device. This may include, but is not limited to discrete GPU integrated circuits, field-programmable gate arrays (FPGAs), application-specific integrated circuits (ASICs), discrete devices otherwise operable as central processing units, and system-on-a-chip (SoC) implementations. The term "CPU", as used herein, broadly refers to a device with the function or purpose of a central processing unit, independent of specific graphics-rendering capabilities, such as executing programs from system memory. In some implementations, it is possible that a SoC may include both a GPU and a CPU; in which case the SoC may be considered both the GPU and the CPU.

Figure 2:
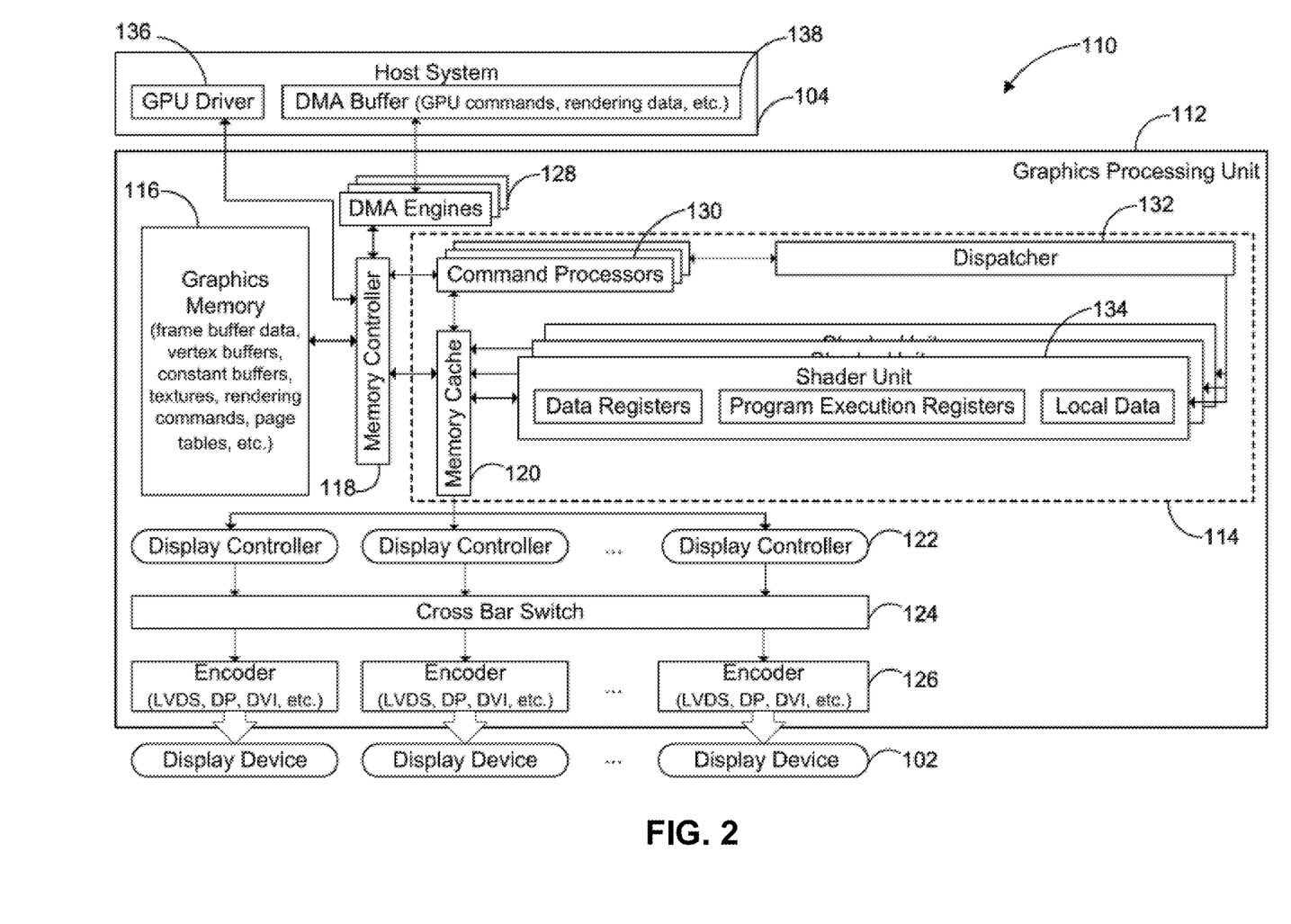
FIG. 2 is a high-level architectural diagram of a graphics system according to at least one embodiment.

Referring now to FIG. 2, illustrated therein is a graphics system 110 according to at least one embodiment. The graphics system 110 may include a GPU 112 and some of the computer 104. In this example the GPU 112 is shown as including graphics memory (sometimes referred to as video memory or VRAM) 116, a memory controller 118, memory cache 120, display controllers 122, a cross-bar switch 124, encoders 126, direct memory access (DMA) engines 128, command processors 130, a dispatcher 132, and shader units 134. Generally, the memory cache 120, command processors 130, dispatcher 132, and shader units 134 may be referred to collectively as a GPU engine 114. The GPU engine 114 may provide GPU subsystems.

Although the GPU 112 in FIG. 2 is shown to include components such as the display controller 122, cross-bar switch 124, and encoders 126, it will be understood that components such as the display controller 122, cross-bar switch 124, and encoders 126 may be logically separate entities from the GPU 112. In particular, the display controller 122, cross-bar switch 124, and encoders 126 may be logically and/or physically separate from the GPU 112.

The graphics system 110 may further include a GPU driver 136 and a DMA buffer 138, which are a part of the computer 104. The memory controller 118 may be coupled to the GPU driver 136. The DMA engines 128 may be coupled to the DMA buffer 138. The DMA buffer 138 may provide commands and rendering data 106 to the DMA engines 128 of the GPU 112.

The graphics memory 116 may store data including, but not limited to, frame buffer data, command buffers, vertex buffers, constant buffers, textures, and page tables. The memory controller 118 may access data stored on the graphics memory 116 and provide data and commands to the GPU engine 114. The GPU engine 114 may process the data and commands—for example, using one or more command buffers—and in response, create an image that is provided to the memory controller 118 for storage in the graphics memory 116. The image may include one or more lines, wherein each line includes at least two pixels.

A display controller 122, via the memory controller 118 and in response to commands from, e.g., a GPU engine, may extract the image for display from the graphics memory 116. The display controller 122 may convert the image to a display output that is compatible with the display 102. The display output may be provided to the cross bar switch, which in turn, is provided to the encoders 126. The encoders 126 may be coupled to the display 102, and may encode the pixel data according to the format used for connection to the display 102. Examples of encoders include Low-Voltage Differential Signalling (LVDS), Digital Visual Interface (DVI), DisplayPort (DP), and the like.

As set out herein, the described embodiments generally provide for multiple-buffered display rendering without the use of hardware or software interrupts, which can have applications, e.g., in safety critical environments.

In the described embodiments, multiple command buffers inside a GPU (or a GPU engine) are used to allow the GPU to monitor its own processes, and thereby implement enhanced triple buffering. Generally, command buffers are buffers used to process drawing commands and, where appropriate, also to control display controllers using display controller commands. Generally, command buffers are capable of operating asynchronously, which enables the described triple buffering techniques without the use of interrupts.

The described interrupt-less triple buffering approaches generally use at least two command buffers that are capable of operating asynchronously. A first command buffer generally contains commands, which, when executed, write frame data to a plurality of frame buffers in round-robin fashion. A second command buffer, which is executed asynchronously to the first command buffer, contains commands to handle waiting for frames to be completed, handle display timing (e.g., display synchronization interval, such vertical sync or vertical blanking intervals), and to cause the display controller to display the correct frames. Broadly speaking, the first command buffer may be considered to be a "render" command buffer, while the second command buffer may be considered to be a "display" command buffer.

Figure 3:
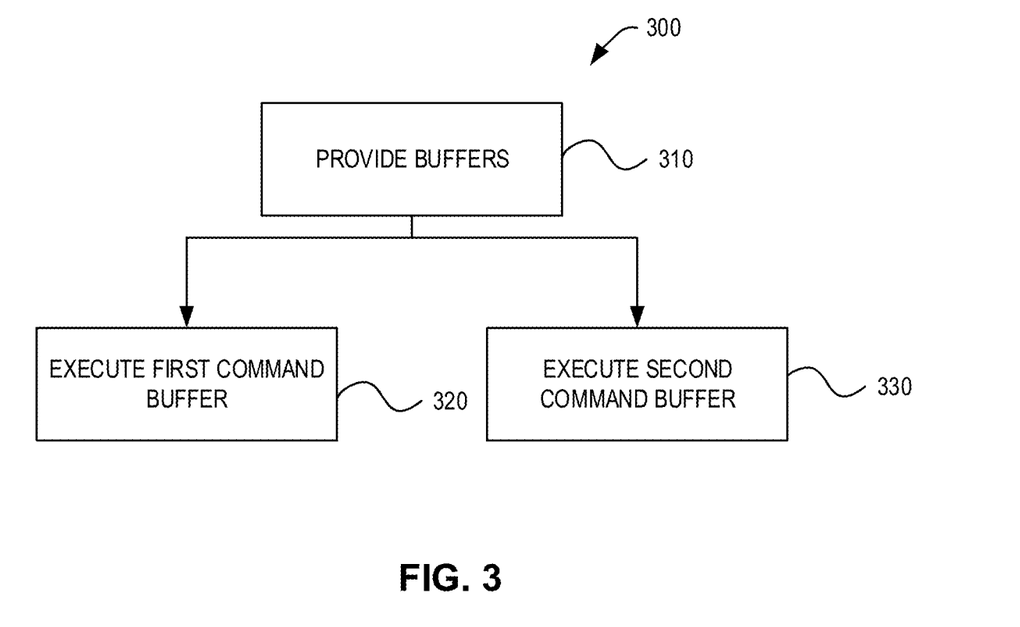
FIG. 3 is a process flow diagram for a method of asynchronously buffering rendering by a GPU to a display in a safety critical environment according to at least one embodiment.

Referring now to FIG. 3, there is illustrated a process flow diagram for a method of asynchronously buffering rendering by a GPU to a display in a safety critical environment. In particular, method 400 is a method of interrupt-less triple buffering using at least two command buffers and may be performed, for example, by computer 104 and graphics system 110 as described herein. Generally, method 400 does not rely on or require software or hardware interrupts.

Method 300 begins at 310 with providing at least a first command buffer (e.g., "render" command buffer) and a second command buffer (e.g., "display" command buffer) in a memory, such as graphics memory 116 of GPU 112. Each command buffer may be assigned to particular, independent GPU engines 114, or to independent command processors 130 so that each of the command buffers can be executed asynchronously to each other.

At 320, a first command processor of a GPU executes the first command buffer to write image data to a plurality of frame buffers in round-robin fashion. At 330, a second command processor of the GPU executes the second command buffer asynchronously and in parallel to execution of the first command buffer by the first command processor. Execution of the second command buffer causes the second command processor to wait for a signal from the first command processor (which is asynchronously executing the first command buffer) that directs the second command processor that new frame data is available, and upon receiving the signal from the first command processor, signaling a display controller to display contents of a selected frame buffer on a next display synchronization interval. Both command processors continue to execute their respective buffers in a looping fashion.

Figure 4A:
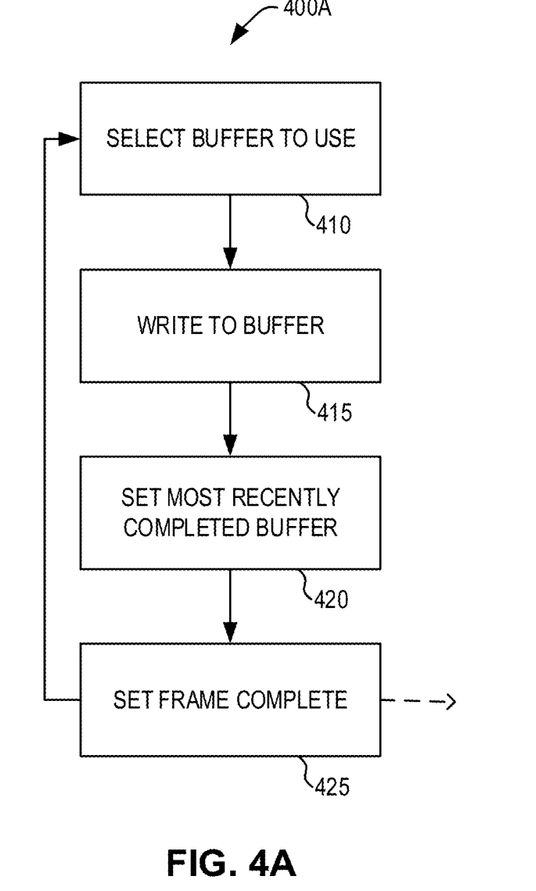
FIG. 4A is a process flow diagram for a first command buffer, for use with the method of FIG. 3.

Referring now to FIG. 4A, there is illustrated a process flow diagram for a first command buffer, in accordance with method 300. Method 400A may be carried out by a first command processor, for example, which is part of computer 104 and graphics system 110 as described herein.

At 410, the first command processor selects a current draw buffer, which is to receive frame data; that is, selects a current draw buffer be used for drawing image data for a new frame. Generally, the selection is performed in a round-robin fashion. However, different buffers may be locked at different times, since any one of them may contain the currently displayed frame data at any given time. Accordingly, to select an available buffer, the first command processor may execute a selection algorithm immediately upon completing writing a frame. One example algorithm that may be used to select a current draw buffer (e.g., variable "CurrentDrawBuffer") from a plurality of buffers (e.g., where the number of buffers is represented by the constant "NumberOfBuffers") is as follows:

1. Set variable CurrentlyDisplayed to buffer displayed by display controller.
2. Set variable CurrentDrawBuffer to the result of ((CurrentDrawBuffer+1) % NumberOfBuffers).
3. If variable CurrentDrawBuffer is equal to CurrentlyDisplayed then again compute the expression ((CurrentDrawBuffer+1) % NumberOfBuffers) and change the variable CurrentDrawBuffer to the latest result.

In other words, the algorithm will generally direct the first command processor to the next draw buffer in sequence, in round robin fashion. However, if the selected draw buffer happens to be currently in use, then the algorithm will select the next buffer in the sequence. In this way, the GPU engine always draws to an unused buffer, and the display controller can display a stable, completed buffer.

Accordingly, in some embodiments, selecting the selected frame buffer involves determining a displayed frame buffer with contents currently displayed by the display controller, performing a round-robin selection from the remaining plurality of frame buffers.

At 415, the selected frame buffer for drawing may be written to by the GPU to provide new frame data, or CPU, according to the needs of the application program generating image data. The first command processor may monitor the selected frame buffer to determine when the image data is complete.

Once the image data is written to the selected frame buffer, and the frame is complete, then at 420 the first command processor may mark the selected frame buffer as the one which is most recently updated, that is, the most recently completed. For example, the first command processor may update a "MostRecentlyCompleted" variable stored in a shared memory that is also accessible to the second command processor.

At 425, the first command processor may signal the second command processor—which is asynchronously executing commands from the second command buffer—that a new frame has been completed, and that the frame data therein is ready for transmission to a display controller. For example, the first command processor may update a "FrameComplete" flag variable in the shared memory that is also accessible to the second command processor. In some cases, updating the "FrameComplete" flag variable may involve switching to a first value from a second value, e.g., where the first value is "true" and the second value is "false", or vice versa.

Figure 4B:
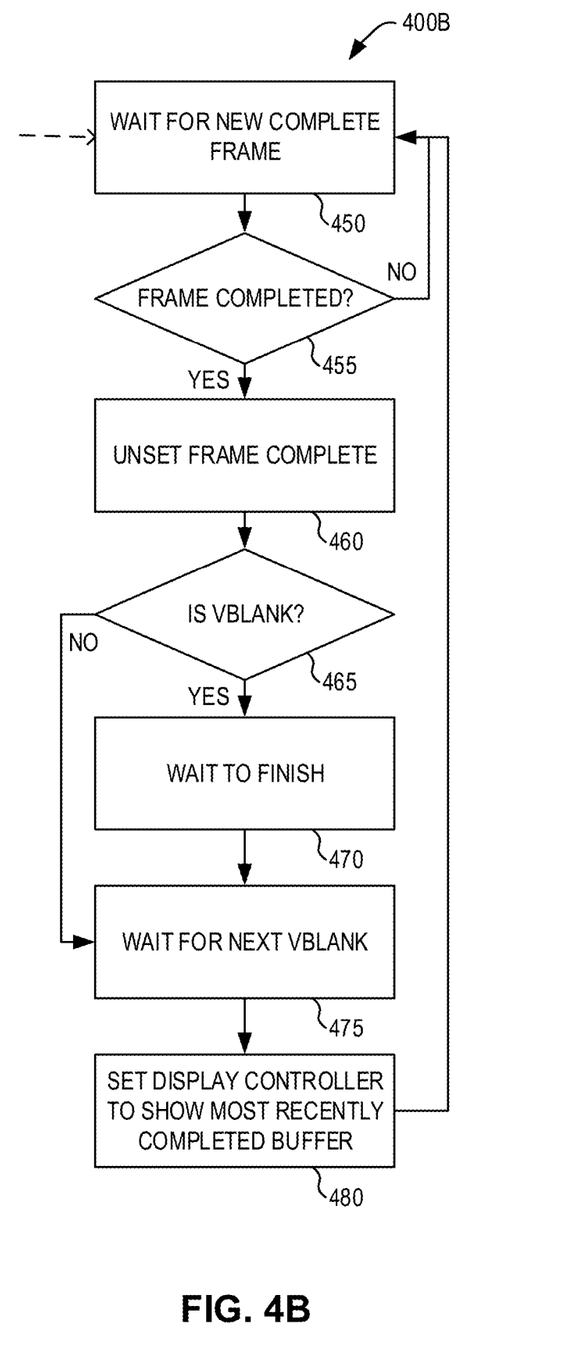
FIG. 4B is a process flow diagram for a second command buffer, for use with the method of FIG. 3.

Upon completing 425, the first command processor may loop by returning to 410, to select a new selected frame buffer and continue repeating method 400A. In this way, method 400A can be looped continuously and asynchronously to method 400B, as described herein.

Referring now to FIG. 4B, there is illustrated a process flow diagram for a second command buffer, in accordance with method 300. Method 400B may be carried out by a second command processor, for example, which is part of computer 104 and graphics system 110 as described herein. As described herein, method 400B can be carried out asynchronously to method 400A.

At 450, the second command processor waits for a predetermined interval to allow for a new frame to be completed for display. At 455, the second command processor determines whether a new frame is completed, for example, by checking the status of a "FrameComplete" variable stored in shared memory by the first command processor executing method 400A. In some cases, other signaling techniques may be used.

If no new frame has been completed, the second command processor returns to 450. Otherwise, the second command processor proceeds to 460, where the "FrameComplete" variable may be unset in the shared memory.

At 465, the second command processor detects via the display controller whether a display synchronization interval is currently in progress and, if yes, waits at 470 for a predetermined period—or until receiving a display synchronization interval completion signal from the display controller—before proceeding.

At 475, the second command processor waits for a next display synchronization interval to begin and, once the display synchronization interval begins, the second command processor at 480 determines the most recently updated frame buffer (e.g., by checking the variable MostRecentlyCompleted in a shared memory), which becomes the selected frame buffer, and signals the display controller to display the contents of the selected frame buffer.

Optionally, the second command processor may wait for the display synchronization interval to be completed before continuing. In some cases, various other delays of one or more predetermined intervals may be introduced to prevent multiple frame updates from occurring within a single display synchronization interval.

The second command processor may subsequently loop by returning to 450, to wait for a new completed frame and continue repeating method 400B. In this way, method 400B can be looped continuously asynchronously to method 400A.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method of asynchronously buffering rendering by a GPU to a display in a safety critical environment, the method comprising:
   providing a plurality of frame buffers for storing image frame data for display;
   executing, by a first command processor, a first command buffer in the GPU, wherein executing the first command buffer comprises:
     writing completed image frame data to a selected frame buffer of the plurality of frame buffers in round-robin fashion;
     upon completing the writing of the completed image frame data to the selected frame buffer, updating a most recently completed frame variable, located in a shared memory, to correspond to the elected frame buffer;
     signaling, to a second command processor, that a new frame is complete by setting a frame completed flag variable, located in the shared memory, to a first value;
   executing, by a second command processor, a second command buffer in the GPU asynchronously and in parallel to execution of the first command buffer, wherein executing the second command buffer comprises:
     monitoring the frame completed flag variable in the shared memory to determine if the variable is set to the first value;
     in response to determining the frame completed flag variable is set to the first value;
     accessing the most recently completed frame variable in the shared memory;
     determining that the most recently completed frame variable corresponds to the selected frame buffer; and
     signaling a display controller to display contents of the selected frame buffer, of the plurality of frame buffers, on a next display synchronization interval; and
   displaying, by the display controller, the contents of the selected frame buffer, of the plurality of frame buffers, in response to receiving the signal from the second command processor.

2. The method of claim 1, wherein executing the second command buffer further comprises waiting for a display synchronization interval start signal from the display controller, prior to signaling the display controller to display the contents of the selected frame buffer.

3. The method of claim 2, wherein executing the second command buffer further comprises, prior to waiting for the display synchronization interval start signal, detecting that a display synchronization interval is in progress, and waiting for a display synchronization interval completion signal from the display controller.

4. The method of claim 1, wherein executing the first command buffer comprises:
   selecting the selected frame buffer from the plurality of frame buffers to receive the completed image frame data.

5. The method of claim 4, wherein selecting the selected frame buffer further comprises determining a displayed frame buffer with contents currently displayed by the display controller, and wherein the selection is performed in round-robin fashion from the plurality of frame buffers other than the displayed frame buffer.

6. The method of claim 1, wherein after signaling the display controller to display contents of the selected frame buffer, executing the second command buffer further comprises setting the frame completed flag variable to a second value.

7. The method of claim 6, wherein the first value is true, and wherein the second value is false.

8. The method of claim 1, wherein executing the second command buffer further comprises waiting one or more predetermined intervals to prevent multiple frame updates in a selected display synchronization interval.

9. The method of claim 1, wherein the plurality of frame buffers consists of a first frame buffer and a second frame buffer.

10. The method of claim 1, wherein the plurality of frame buffers comprises at least three frame buffers.

11. A non-transitory computer readable medium storing computer-executable instructions, which when executed by a graphics unit comprising first and second command processors, cause the graphics unit to carry out a method of asynchronously buffering rendering to a display in a safety critical environment, the method comprising:
   providing a plurality of frame buffers for storing image frame data for display;
   executing, by the first command processor, a first command buffer in the GPU, wherein executing the first command buffer comprises:
     writing completed image frame data to a selected frame buffer of the plurality of frame buffers in round-robin fashion;
     upon completing the writing of the completed image frame data to the selected frame buffer, updating a most recently completed frame variable located in a shared memory, to correspond to the selected frame buffer;

signaling, to a second command processor, that a new frame is complete by setting a frame completed flag variable, located in the shared memory, to a first value;

executing, by the second command processor, a second command buffer in the GPU asynchronously and in parallel to execution of the first command buffer, wherein executing the second command buffer comprises:

monitoring the frame completed flag variable in the shared memory to determine if the variable is set to the first value;

in response to determining the frame competed flag variable is set to the first value;

accessing the most recently completed frame variable in the shared memory;

determining that the most recently completed frame variable corresponds to the selected frame buffer; and signaling a display controller to display contents of the selected frame buffer, of the plurality of frame buffers, on a next display synchronization interval;

displaying, by the display controller, the contents of the selected frame buffer, of the plurality of frame buffers, in response to receiving the signal from the second command processor.

12. An asynchronously buffered graphic display rendering system, the system comprising:

a memory storing a plurality of frame buffers storing image frame data for display, the memory also storing a frame completed flag variable and a most recently completed frame variable;

a graphics unit comprising a first command processor and a second command processor that operates asynchronously to the first command processor, the first command processor configured to execute a first command buffer to:

write completed image frame data to a selected frame buffer of the plurality of frame buffers in round-robin fashion;

upon completing the writing of the completed image frame data to the selected frame buffer, updating a most recently completed frame variable to correspond to the selected frame buffer;

signaling, to a second command processor, that a new frame is complete by updating the frame completed flag variable to a first value;

the second command processor configured to execute a second command buffer asynchronously to execution of the first command buffer, wherein executing the second command buffer comprises:

monitoring the frame completed flag variable to determine if the variable is set to the first value;

in response to determining the frame competed flag variable is set to the first value;

accessing the most recently completed frame variable;

determining that the most recently completed frame variable corresponds to the selected frame buffer; and signaling the display controller to display contents of the selected frame buffer, of the plurality of frame buffers, on a next display synchronization interval; and displaying, by the display controller configured to display the contents of the selected frame buffer, of the plurality of frame buffers, in response to receiving the signal from the second command processor.

13. The system of claim 12, wherein executing the second command buffer further comprises waiting for a display synchronization interval start signal from the display controller, prior to signaling the display controller to display the contents of the selected frame buffer.

14. The system of claim 12, wherein after signaling a display controller to display contents of the selected frame buffer, executing the second command buffer further comprises setting the frame completed flag variable to a second value.

15. The system of claim 14, wherein the first value is true, and wherein the second value is false.

16. The system of claim 12, wherein executing the first command buffer comprises:

selecting the selected frame buffer from the plurality of frame buffers to receive the completed image frame data.

17. The system of claim 16, wherein selecting the selected frame buffer further comprises determining a displayed frame buffer with contents currently displayed by the display controller, and wherein the selection is performed in round-robin fashion from the plurality of frame buffers other than the displayed frame buffer.

18. The system of claim 13, wherein executing the second command buffer further comprises, prior to waiting for the display synchronization interval start signal, detecting that a synchronization is in progress, and waiting for a display synchronization interval completion signal from the display controller.

* * * * *

UNITED STATES PATENT AND TRADEMARK OFFICE
CERTIFICATE OF CORRECTION

PATENT NO. : 11,049,211 B2
APPLICATION NO. : 16/027525
DATED : June 29, 2021
INVENTOR(S) : Aidan Fabius It is certified that error appears in the above-identified patent and that said Letters Patent is hereby corrected as shown below:

In the Claims

In Claim 1, Column 11, Line 50, "shared memory, to correspond to the elected frame" should read --shared memory, to correspond to the selected frame--

In Claim 11, Column 13, Line 17, "in response to determining the frame competed flag" should read --in response to determining the frame completed flag--

In Claim 12, Column 13, Line 46, "frame data to the selected frame buffer, updating a" should read --frame data to the selected frame buffer, updating the--

In Claim 12, Column 13, Line 49, "signaling, to a second command processor, that a new" should read --signaling, to the second command processor, that a new--

In Claim 12, Column 14, Line 7, "in response to determining the frame competed flag" should read --in response to determining the frame completed flag--

Signed and Sealed this
Twenty-fourth Day of January, 2023

Katherine Kelly Vidal
*Director of the United States Patent and Trademark Office*